July 12, 1949.   F. A. PARSONS   2,476,214
PATTERN CONTROLLED MACHINE TOOL

Filed Aug. 18, 1947   2 Sheets-Sheet 1

INVENTOR.
FRED A. PARSONS, DECEASED,
EDNA MARY PARSONS, EXECUTRIX.
BY W. H. O'Connor July 12, 1949.  F. A. PARSONS  2,476,214
PATTERN CONTROLLED MACHINE TOOL Filed Aug. 18, 1947  2 Sheets-Sheet 2

INVENTOR.
FRED A. PARSONS, DECEASED,
EDNA MARY PARSONS, EXECUTRIX.
BY W. D. O'Connor
ATTORNEY Patented July 12, 1949

2,476,214

UNITED STATES PATENT OFFICE 2,476,214

PATTERN CONTROLLED MACHINE TOOL

Fred A. Parsons, deceased, late of Milwaukee, Wis., by Edna Mary Parsons, executrix, Milwaukee, Wis., assignor to Kearney & Trecker Corporation, West Allis, Wis., a corporation of Wisconsin Application August 18, 1947, Serial No. 769,199

15 Claims. (Cl. 318—77)

This invention relates to machine tools, and more particularly to machines of the type commonly termed automatic copying machines whereby the form of a pattern or master may be copied through the operation of tracer controlled mechanism that controls the relative movements of a workpiece and a cutting tool.

In an automatic copying machine, the copying operation is ordinarily performed under the control of tracer apparatus which responds to the profile of a pattern being traversed and operates to regulate relative tool and work movements in two or more mutually transverse paths, thereby causing the tool to complete the form of the pattern on a workpiece. In the usual arrangement for automatic copying, relative movement between the tool and the workpiece is maintained continuously in one direction along one path throughout a stroke of movement that is designated the "line" movement. Simultaneously, movement in another path is caused to occur in either direction under the control of the tracer mechanism in accordance with the requirements of the pattern being traced, this being designated the "in-out" movement. In order that the copying operation may proceed with maximum speed and the highest degree of accuracy, it is desirable that the "line" and "in-out" movements should be correlated in such manner that the combined rate of movement may be maintained substantially uniform.

A purpose of the invention is to provide an improved copying machine wherein the rates of relative movement in the "line" and "in-out" directions are correlated in manner to facilitate the reproduction of the form of a pattern upon a workpiece.

A further purpose is to provide a copying machine in which the copying feed rate is maintained substantially constant regardless of the direction of relative movement between the tool and the workpiece in reproducing the profile of a pattern.

A further purpose is to provide improved copying control mechanism for the simultaneous control of two motors operating respectively to effect relative movements of a tool and a workpiece in transverse paths.

A further purpose is to provide an improved control mechanism for the driving motors of a machine tool wherein the speed of one driving motor may be controlled in response to both its own speed and the speed of a second driving motor.

A further purpose is to provide a copying machine in which the rate of relative movement in the "line" path is governed in manner to limit its maximum rate, and is further controlled in response to the rate of operation of the "in-out" movement.

A further purpose is generally to simplify and improve the construction and operation of the control mechanism for a copying machine, and still other purposes will be apparent from this specification.

Various modifications of the structures illustrated and described are contemplated, and it is to be understood that the invention herein set forth and claimed is intended to include all modifications of the illustrated structures that come within the spirit and scope thereof, and of the claims.

Throughout the specification, the same reference characters have been used to identify the same parts, and in the drawings.

Figure 1:
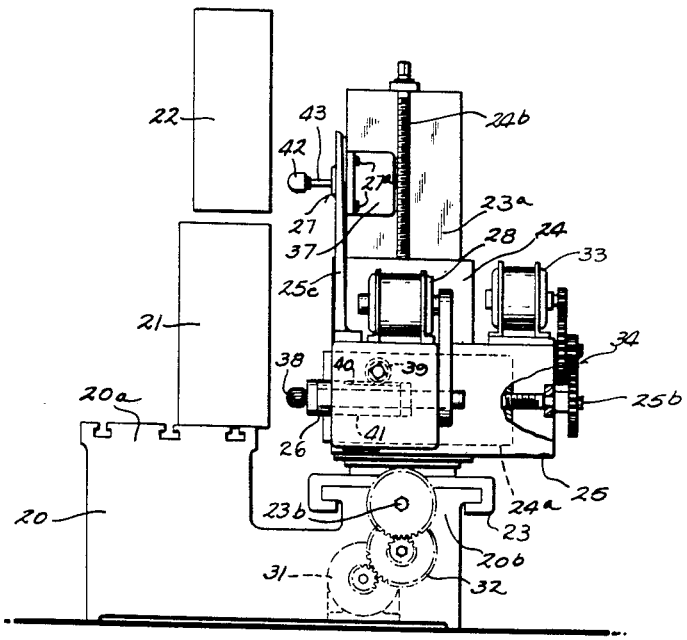
Figure 1 is a semi-diagrammatic view in end elevation of a copying machine incorporating the present invention.

In the particular copying machine shown in Fig. 1, a base 20 is provided with a stationary work support or table portion 20a for carrying a workpiece such as 21 and a pattern such as 22, each rigidly fixed with the support 20a by means of suitable fixtures and clamps (not shown). A longitudinally movable support 23 is carried by a slide portion 20b likewise provided on the bed 20. The support 23 carries a support 24 vertically movable on a slide portion 23a thereof, the support 24 in turn carrying a support 25 movable toward and from the pattern and workpiece on a slide portion 24a. Each of the movable supports is provided with suitable screw and nut means including screws 23b, 24b and 25b, respectively, for the different supports, each of which may be actuated manually by suitable cranks (not shown) applied to the squared ends of the screws, or may be power actuated by transmission mechanism later described.

The support 25 carries a rotatable tool spindle 26 and a tracer unit 27, the tracer unit being carried on an upwardly extending arm or bracket 25c fixed on the support 25, and guided on the bracket for vertical adjustment. The tracer unit 27 may be fixed to the bracket 25c by the means of bolts, such as 27a, in a predetermined spaced position relative to spindle 26, corresponding to the desired spacing of the configuration of pattern 22 relative to the workpiece 21 on which a similar configuration is to be copied.

Tool spindle 26 is driven selectively at any of various speeds by a motor 28 carried on support 25, there being suitable means (not shown) provided for effecting the various spindle speeds, as by any conventional control of the motor speed or by any suitable speed changer in the train connecting the motor and spindle.

Figure 2:
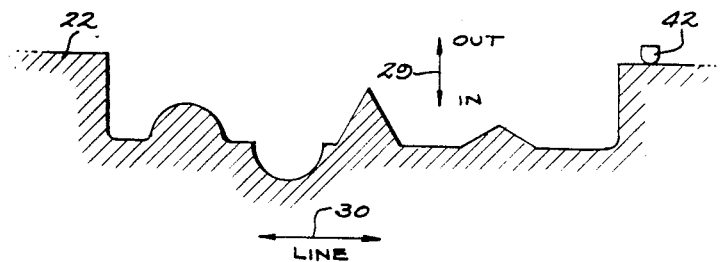
Fig. 2 is a cross sectional view of a pattern illustrating a profile such as might be copied by the machine shown in Fig. 1.
Figures 3, 4, 5:
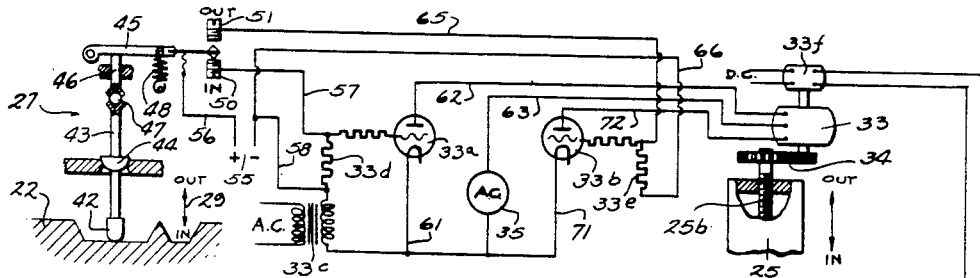
Fig. 3 is a diagrammatic view of the transmission and control mechanism embodying the invention and incorporated in the machine shown in Fig. 1.
Fig. 4 is a diagrammatic view showing a modified form of part of the control mechanism illustrated in Fig. 3; and, Fig. 5 is a detailed diagrammatic view of part of the modified control mechanism shown in Fig. 4.

In a machine such as shown in Fig. 1, a pattern profile such, for example, as is shown in cross section in Fig. 2 or 3, may be copied on the workpiece by utilizing the movements of support 25 toward and from the pattern, respectively, to effect "in" and "out" directions of movement, as indicated by an arrow 29 in Figs. 2 and 3. In such case, the "line" path of movement, indicated by an arrow 30 in Figs. 2 and 3 as transverse to the "in-out" path, may be effected either by the vertical movement of support 24 or by the longitudinal movement of support 23 of the machine of Fig. 1. Whichever of these supports 23 or 24 is selected for the "line" movement, the other may be provided with means for effecting a "cross" movement transverse to both the "in-out" and "line" paths, the "cross" movement preferably being by means of a step-by-step action limited to take place at one or both ends of the reciprocatory "line" movement.

It is apparent that the "line," "in-out" and "cross" copying movements mentioned, may be effected by any suitable arrangement of supports which will effect relative work and tool movements in each of three mutually transverse paths. Thus, for example, the pattern 22 and work 21 may be bodily movable, instead of the tracer and tool, or the tracer and spindle may be arranged for the spindle axis to be vertical, or disposed in any other desired direction. It will therefore be understood that the copying transmission and control mechanism described herein may be used for any suitable arrangement and use of three supports relatively movable in mutually transverse paths and, to avoid confusion, the relative support movements will be referred to herein as "line" and "in-out" movements relative to the pattern profile as identified in Fig. 2, and the "cross" movements will be understood to be transverse to each of the other paths, irrespective of the direction of the movements relative to the horizontal or vertical.

The copying transmission and control mechanism diagrammatically shown in Fig. 3, may be used for any suitable support arrangement as stated, but as applied herein to the machine of Fig. 1, the "line" movement is effected by the support 23, by the means of a reversible electric motor 31, operatively connected to the screw 23b, there being in the driving connection, rate changing means, for example, a gear pair 32, the gears of which are reversible in position and interchangeable with other gear pairs in the usual manner to adjust the rate of movement. The "in-out" movement is effected by the support 25, by the means of a reversible electric motor 33 operatively connected to the screw 25b by a rate changing gear pair 34. The "cross" movement of the machine is effected by the support 24, by the means of the screw 24b, Fig. 1, which is restrained against axial movement relative to the slide 23a, there being suitable nut means (not shown) engaging the screw and fixed with support 24. Screw 24b is preferably given a step-by-step rotation for effecting an increment of "cross" feed at either or both ends of the "line" movement of support 23 by any suitable means (not shown), there being a variety of well known devices which may be used for such purpose as, for example, the means illustrated and described in U. S. Patent No. 2,335,304 issued November 30, 1943, to Fred A. Parsons, wherein the "cross" feed screw is actuated from the "line" support transmission by dog operated ratchet means.

The tracer unit 27, Figs. 1 and 3, includes a hollow frame or housing 37 in adjustably fixed relation to a cutter 38 carried by the tool spindle 26. The tracer unit is adjustable vertically, as shown in Fig. 1, and secured by the T-bolts 27a, as has been stated, and the spindle and tool are adjustable relative to the tracer by the means of a gear 39 engaging suitable rack teeth 40 on a spindle sleeve 41, the gear shaft having a squared end, as shown, exposed for a crank or wrench. Suitable means (not shown) are provided for clamping the spindle sleeve in adjusted position.

The tracer includes a pattern feeler or stylus portion 42, Figs. 1 and 3, removably fixed on the outer end of a rod or shank 43, the rod being mounted in the housing 37 in manner to permit movement of the stylus 42 outwardly relative to the pattern, that is to say, upwardly as shown in Fig. 3, or laterally in any direction, as for example, by a ball pivot portion 44. Either the outward or lateral stylus movement shifts a contact bar or arm 45, which is pivoted in the housing 37, there being a slidable connector rod member 46 aligned with the rod 43 and with its lower end, Fig. 3, presenting a conical seat that receives a ball 47 which rests in a similar conical seat in the upper end of the rod 43. Various stylus members having axial lengths to suit different patterns may be used, along with various conical seats having different cone angles such that the pivotal movement of the contact bar 45 is substantially equal for equal increments of either lateral or vertical movement of the stylus which is in use at the time.

The pivoted contact bar 45 is continuously yieldably urged inwardly, that is to say, downwardly in Fig. 3, as for example, by spring means 48 shown, to a position effecting a closed circuit through an adjustable "in" contact screw 50, which is the normal position of the contact bar when the tracer stylus is free of the pattern, the spring 48 simultaneously urging the stylus to its extreme downward and laterally centered position, Fig. 3. Sufficient displacement of the stylus 42 either laterally or outwardly from the "in" position, will move the contact bar 45 in manner to open the "in" contact 50 and, subsequently, to close a circuit through an adjustable "out" contact screw 51.

The pattern controlled movements of the tracer contact bar 45 control the operation of the electric motor 33 for determining the "in" or "out" direction of movement of support 25 and also serve to control indirectly the operation of the electric motor 31, whereby to determine the relative rates of movement of the supports 23 and 25.

The circuit diagram, Fig. 3, is illustrative of certain features of the control, although it is to be understood that modifications of the control structures may be used. Referring more specifically to the diagram, the "line" support 23 and the "in-out" support 25 are indicated as movable in mutually vertical paths and respectively driven by the reversible electric motors 31 and 33, the drive in each instance including the rate change means illustrated by the gear pairs 32 and 34 which are reversible in position and interchangeable with other gear pairs, as previously mentioned.

The motors 31 and 33 are preferably in this instance each of the split-field D. C. series type, the forward and reverse field portions being respectively energized through individual "Thyratron" type tubes, such as 31a, 31b, 33a and 33b, the tube anode circuits being completed in each case through an A. C. source, such as 35.

For each control tube, there is a grid control circuit of conventional type. For purposes of the present description, the grid control circuits are each indicated as being of an off-on type of which the circuit of the "in" tube 33a is illustrative. Such a control circuit may include a transformer 33c which continuously provides the grids of tubes 33a and 33b with an A. C. biasing component lagging the anode A. C. by about 180° and inoperative, alone, to fire the tube, and including a resistor 33d which is connected to control means which is alternatively operable, either to provide a positive D. C. grid voltage component which is sufficient to fire the tube at the start of the positive half-cycle of anode A. C., or to reduce the grid voltage to a point where the tube does not fire at all.

For the "in-out" motor 33, the firing control resistors, such as 33d of the "in" tube 33a and a similar firing control resistor 33e of the "out" tube 33b are, respectively, supplied with tube firing D. C. voltage accordingly, as the "in" or "out" contacts 50 or 51 of the tracer 27 are closed, the tracer being of the conventional type in which the "in" contact 50 is closed whenever the stylus 42 is free of the pattern 22, and the "out" contact 51 is closed whenever the stylus is sufficiently displaced either laterally or axially from the "in" position, there being an intermediate stylus position in which both contacts are open.

For example, when the stylus is free of the pattern, the "in" contact 50 is closed, thereby establishing a circuit from one side of a D. C. source 55 through a conductor 56, the contact bar 45, the "in" contact 50 and a conductor 57 to the grid of the tube 33a and one side of the control resistor 33d. A return circuit extends from the other side of the resistor 33d through a conductor 58 to the other side of the source 55.

The grid biasing voltage thus established causes the tube 33a to fire, thereby permitting a flow of half-cycle current from the A. C. source 35 through a conductor 61, the tube 33a and a conductor 62 to one field of the motor 33, the current returning through the motor armature and a common conductor 63 to the source 35. The field connections are such that under these conditions the motor 33 will operate in direction to effect "in" movement of the support 25 for bringing the stylus 42 into engagement with the pattern 22.

When the stylus 42 engages the pattern, the "in" contact 50 is opened, thereby causing the tube 33a to stop firing and discontinuing the flow of current to the "in" field of the motor 33. Upon farther outward movement of the stylus 42 by the pattern 22, the "out" contact 51 is closed, thereby establishing a circuit from the D. C. source 55 through the conductor 56, the contact bar 45 and the "out" contact 51 to a conductor 65. The conductor 65 leads to the grid of the tube 33b and to one side of the control resistor 33e from the other side of which a return conductor 66 returns to the source 55.

The biasing voltage thus established on the grid of the tube 33b causes the tube to fire, thereby permitting half-cycle current to flow from the A. C. source 35 through a conductor 71, the tube 33b and a conductor 72, to the other or "out" field of the motor 33, the current returning through the motor armature and the common conductor 63 to the source 35. Energization of the "out" field causes the motor 33 to operate in direction to effect "out" movement of the support 25, thereby withdrawing the cutter 38 outwardly with respect to the workpiece 21.

As the tracer stylus 42 continues in movement across the pattern 22 through operation of the "line" motor 31 in moving the support 23, the tracer contacts 50 and 51 are closed intermittently as described, in manner to control the "in-out" movement of the cutter 38 in reproducing the profile of the pattern through energizing the motor 33 for operation in the one or the other direction as may be required.

For the "line" motor 31, the firing of the tubes 31a and 31b is controlled in part by a "line" direction switch 74 and in part by a control device 75. The direction switch 74 has alternative "left" and "right" contacts 77 and 78, respectively, connecting the firing control resistors of the "left" tube 31a or the "right" tube 31b for control from the control switch 75 accordingly, as the reverser switch 74 is positioned for "left" or "right" movement of "line" support 23. Reverser switch 74 may be manually shifted, or automatically shifted by adjustable table dogs, such as reversing dogs 81 and 82, whereby the table movement may be reversed at each end of the "line" stroke.

The control switch 75 includes a fixed contact 84 and an associated pivoted contactor 85 which, when contacts 84 and 85 are closed, applies a positive grid bias from the D. C. source 55 to the firing control resistor of tube 31a or of tube 31b, according to the position of direction switch 74.

The alternative opening and closing of contacts 84 and 85 operates primarily to control the speed of the "line" motor 31, and this action is controlled as follows:

The motors 31 and 33 have associated therewith saturated field type D. C. generators 31f and 33f, respectively, the voltage output of which, in each instance, increases linearly through a range of zero to maximum with the speed of the corresponding motor and, consequently, with the rate of travel of the support driven thereby. The respective generators are continuously connected to supply current to different "line" and "in-out" coils 75a and 75b, respectively, of a solenoid device which continuously urges the pivoted contactor 85 associated with contact 84 in a direction to open the contacts. At the same time, the pivoted contactor 85 is continuously urged in a direction to engage the contact 84 by the means of a spring 86. The contacts 84 and 85 will, therefore, open or close accordingly, as the instant force of solenoid device coils 75a and 75b, or of spring 86 is predominant. When the contacts 84 and 85 are closed, the one or the other tube 31a or 31b will be firing at maximum to accelerate the motor 31 and "line" support 23 in the direction determined by the reverser switch 74. When contacts 84 and 85 are open, no current will be supplied to motor 31 and suitable controlled brake means (not shown) may be applied, if desired, to decelerate the motor and support.

With the contacts 84 and 85 closed, and the reverser switch 74 in position for effecting "left" movement of the "line" support 23, direct current flows from the source 55 through a conductor 91, the pivoted contactor 85, fixed contact 84 and a conductor 92 to the switch 74. With the switch 74 in the left position, the current flows from it to the contact 77 and thence through a conductor 93 to the grid of the "left" tube 31a, the return circuit leading through a control resistor 31d and a conductor 94 back to the other side of the direct current source 55. This causes the tube 31a to fire, thereby permitting a flow of current from the A. C. source 35 through a conductor 96, the tube 31a and a conductor 97 to one field of the motor 31, the current returning through the motor armature and a common conductor 98 to the source 35. With the proper field energized, the motor 31 will then operate in direction to effect "line" movement of the support 23 to the left.

When the reversing switch 74 is positioned to effect movement of the "line" support 23 to the right, it engages the contact 78 whereupon the control current flows from this contact through a conductor 99 to the grid of the tube 31b, the return circuit leading through a control resistor 31e and a conductor 100 to the conductor 94 leading back to the source 55. The control circuit thus established causes the tube 31b to fire, thereby permitting current to flow from the A. C. source 35 through a conductor 102, the tube 31b and a conductor 103 to the other field of the motor 31, the return circuit leading through the motor armature and the common conductor 98 back to the source 35. Energization of the other field of the motor 31 in this manner causes the motor to operate in direction to effect "line" movement of the support 23 to the right.

Through automatic operation of the reversing switch 74 by the table dogs 81 and 82, the "line" support 23 may be caused to reciprocate in manner to traverse the tracer stylus 42 over the profile of the pattern 22, the "cross" feed screw 24b being turned, as previously explained, to effect an increment of "cross" feed at either or both ends of the "line" movement of the support 23.

The control generator 31f associated with the "line" motor 31, generates current at a voltage directly proportional to the speed of the motor 31. This current flows through a conductor 106 to the "line" coil 75a of the solenoid device from which it returns through a conductor 107. The arrangement of the control switch 75 is such, that when the "line" support 23 attains a predetermined maximum speed of movement, the current supplied by the generator 31f to the coil 75a is sufficient to cause the solenoid device to exert a force large enough to overcome the force of the spring 86, thereby disengaging the pivoted contactor 85 from the contact 84 to deenergize the control tube and, consequently, deenergize the motor 31. The control generator 31f and the switch 75 thus operate to govern the speed of the motor 31 in manner to prevent it exceeding a predetermined maximum speed.

When the machine is in operation with the tracer stylus 42 traversing the profile of a pattern 22 with the "in-out" motor 33 operating in the one or the other direction, the control generator 33f likewise generates current in proportion to the speed of movement of the "in-out" support 25. This current is transmitted through a conductor 108 to the other coil 75b of the solenoid device from which it returns through a conductor 109. The solenoid coil 75b likewise exerts force in opposition to the spring 86 to move the pivoted contactor 85 out of engagement with the contact 84 for deenergizing the "line" motor 31, the effect of the coil 75b being in addition to that of the coil 75a and regardless of the direction of rotation of the motor 33. This results in reducing the speed of the "line" motor 31 in response to increase in the speed of the "in-out" motor 33, the arrangement being such that with the "in-out" motor 33 operating at maximum speed, the "line" motor 31 will be completely deenergized and the "line" movement will cease. Under circumstances in which the "in-out" motor 33 is operating at less than maximum speed, the speed of the "line" motor 31 will be controlled in inverse proportion to the "in-out" motor speed.

In the particular control arrangement shown in Fig. 3, the switch 75 controls the speed of the "line" motor 31 in such manner that the sum of the instant speeds of the "in-out" support 25 and "line" support 23 has a substantially constant value during the copying operation. Such result is comparable to that where two supports are positively connected, as through a mechanical differential transmission, but the present method has various advantages over a positive differential interconnection as will appear.

For such constant sum of speeds for the various copying angles (from 0° to 90°) the "in-out" and "line" speeds must have specific relative values for each different angle. The solenoid device "line" and "in-out" coils 75a and 75b effect equal forces when equal voltages are applied to the different coils, and the magnitude of the forces exerted by the different coils varies as the individual speeds of the "in-out" and "line" supports. Then, assuming that the sum of the support speeds is substantially constant, as above stated, the sum of the solenoid forces urging the opening of contact 84 will also be substantially constant throughout any range of speeds (zero to maximum). Change of direction of either support does not affect such result, since change of current direction from generators 31f and 33f does not change the direction of the solenoid force.

Each of the "line" and "in-out" solenoids has in its circuit one of two variable resistors 111 and 112, respectively, that are mechanically interconnected in manner to have equal effects in the two circuits. As shown in the drawing, the resistor 111 is connected in and constitutes part of the return conductor 107 leading from the "line" coil 75a. Similarly, the resistor 112 is connected in and constitutes part of the return conductor 109 leading from the "in-out" coil 75b. The two resistors are provided with sliders 111a and 112a, respectively, that are interconnected mechanically for simultaneous operation through equal distances by means of a common actuating knob 113. The knob 113 is provided with an indicator 113a that cooperates with a stationary dial 113b which is graduated to indicate the value of the resistances in the circuits in terms of the copying feed rate.

The spring 86 acts to oppose the solenoid force and in a direction to close the contacts 84 and 85, and the resistors 111 and 112 are adjusted to effect a balance of the opposed contact opening and closing forces such that when the sum of the support speeds have a preferred constant value (such as 1 inch per minute, for example), which is selected by positioning the sliders 111a and 112a of the resistors 111 and 112, respectively, as described, the contacts 84 and 85 are just closed, or just open, as preferred. It will be apparent that by adjusting the resistors 111 and 112, the balanced position of the contactor 85 relative to contact 84 may be effected for any desired constant sum of the support speeds within the range of adjustment of the resistors 111 and 112.

The instant speed of the "in-out" support 25 is controlled by tracer 27 in such manner as to automatically follow any angle of a pattern element "inwardly" or "outwardly," irrespective of the instant "line" speed. It results therefore, that at any setting of resistors 111 and 112, if the line speed is too fast for any pattern angle (that is to say, faster than would effect the selected value for the sum of the speeds), "in" or "out" speed is also too fast, and in such case, the opposed forces controlling switch 75 are unbalanced in a direction to open the contacts 84 and 85, whereby to decrease the "line" speed (the tracer simultaneously decreasing the "in-out" speed) until the opposed forces are again balanced at a point where the "line" speed and "in-out" speed effect the substantially constant sum of speeds determined by the adjustment of resistors 111 and 112.

In similar manner, if the "line" speed is too slow, the "in-out" speed is also too slow, and there is then an unbalance of said opposed forces acting in a direction to close the contacts 84 and 85 until the forces are again balanced.

A similar result occurs if there is any change of pattern angle during the copying, as follows:

If the copying angle increases, the previous "line" speed is always too fast for the new copying angle and the contacts 84 and 85 open, whereby to decrease the "line" speed, but a new balanced condition of the switch 75 will not be effected until the sum of "line" and "in-out" speeds as selected by resistors 111 and 112 is correct for such new angle.

Similarly, if the copying angle decreases, the previous "line" speed is always too slow for the new copying angle, and the contacts 84 and 85 close, whereby to increase the "line" speed and thereby effect a new balanced condition of the switch 75 for the new copying angle.

It will be noted, that adjustment of the resistors 111 and 112 serves all the purposes of selective change of copying rate usually effected through rate change devices of conventional type, but with minute increments of copying rate adjustment. Rate change devices of the usual type, such as 32 and 34, are therefore not required, except as they may be desirable for changing the torque effect of the motors relative to the supports to suit various conditions of the copying operation, or for similar reasons.

It is normally desirable for copying operations that when the pattern angle changes suddenly in a direction which requires a reduced "line" speed, that such "line" speed deceleration take place as rapidly as possible, whereby to prevent inaccuracy due to "line" direction overrun. For such purposes, "line" brake means (not shown) are contemplated, with control means (not shown) for operation of the brakes to urge rapid deceleration of the "line" support under the conditions mentioned. Various such "line" brakes, and control means therefor, have previously been utilized, as shown in copending application Serial No. 512,112, filed November 29, 1943, and a suitable form is contemplated for use in the present machine.

It is also desirable that the tracer controlled "in" or "out" acceleration and deceleration cycles, which operate with the tracer control for determining the instant speed of "in-out" movement, be controlled to effect a materially greater rate of deceleration than of acceleration, whereby to stabilize any "in-out" jiggles in a form of minimum amplitude in minimum time, as set forth in the previously mentioned copending application. Such stabilizing controls (not shown) in suitable form, are contemplated in the present machine, whereby the tracer 27 will effect substantially a straight path copying result for any pattern angle where the angle continues in a certain direction, and will operate to change the copying direction to suit any change in pattern angle in minimum time and with minimum overrun, as explained in the previously mentioned application.

The described controls of the machine, as shown in Fig. 3, may be modified as diagrammatically shown in Fig. 4 in such manner that the copying rate (instead of the sum of the rates in the two support paths) is maintained at any preselected substantially constant rate throughout the copying operation. It will be readily apparent that the copying rate will be maintained substantially constant for all copying angles (0° to 90°) if the instant "in-out" and "line" speeds are controlled in such manner that the sum of their squares remains substantially constant. To effect such substantially constant sum of squares through the range of 0° to 90° copying angles, the construction and operation of the machine, including the construction and operation of the switch device 75 and the variable resistors 111 and 112, is the same as previously described, except that in this instance (Fig. 4) the variable voltage output of the "in-out" generator 33f is directed to the "in-out" coil 75b of the solenoid device through a voltage squaring device 115, and the variable voltage output of the "line" generator 31f is directed to the "line" coil 75a of the solenoid device through a similar voltage squaring device 116.

The voltage squaring devices 115 and 116 of Fig. 4, may be of any of several suitable types, one of which is diagrammatically shown in Fig. 5. In the device of Fig. 5, a variable voltage $E_1$, which may vary between the limits of zero to $E_2$ in one direction, and also between the limits zero to $E_3$ in the other direction, is applied to the input terminals 120 of a servo-controller 121 which reversibly controls a servo-motor 122, such voltage being applied through a center tap 123 of a variable resistor 124 and the slider 125 thereof. The resistor 124 has applied thereto a constant voltage $E_2$ in the one direction from the center tap 123, and a constant voltage $E_3$ in the other direction, each of the voltages $E_2$ and $E_3$ having a value equal to the maximum value of the variable voltage $E_1$ and each of the two resistor portions having linear resistance relationship to the movement of the slider 125. The arrangement is such, that when any voltage $E_1$ is impressed on the input terminals 120, the motor 122 will rotate in proper direction until a bucking voltage from resistor 124 just balances the applied input voltage.

A second resistor 127 has applied thereto a constant voltage $(E_2)^2$ in the one direction from a center tap 128 and a constant voltage $(E_3)^2$ in the other direction, a slider 129 being connected for movement with the shaft of the motor 122 simultaneously with the slider 125. In this instance, each of the resistor portions of the resistor 127 has a tapered resistance such that, as the slider 129 is displaced from zero voltage position, the instant voltage drop across the resistor portion included between the slider and the center tap 128 varies as the square of the instant slider displacement. When the applied voltage $E_1$ is balanced by the bucking voltage $E_2$ or $E_3$, as previously described, the voltage differential $E_4$ across the output terminals of resistor 127 equals the square of the instant applied variable voltage $E_1$.

From the foregoing explanation of the operation of the illustrated embodiment of the invention, it is apparent that there has been provided an improved pattern controlled machine tool in which the operation of the "line" feeding movement is controlled in response to both its own rate of movement and that of the "in-out" feeding movement to achieve maximum effectiveness in reproducing a pattern with the highest degree of accuracy.

Although particular embodiments of the invention have been set forth in detail for the purpose of fully explaining its mode of operation, it is to be understood that the structures shown and described are intended to be illustrative only and that various features of the invention may be otherwise utilized without departing from the spirit and scope of the invention, as defined in the subjoined claims.

What is claimed is:

1. In a pattern controlled machine tool, the combination with line feeding and in-out feeding mechanism, of an electric motor operatively connected to actuate said line feeding mechanism, a generator driven by said line feeding electric motor, speed control apparatus responsive to current from said generator and operative to control the speed of said line feeding motor thereby to limit the maximum speed of operation of said motor, a second electric motor operatively connected to actuate said in-out feeding mechanism, a tracer mechanism operative to control said in-out feeding electric motor in accordance with the requirements of a pattern being followed, and a second generator driven by said in-out feeding motor, said second generator likewise being connected to furnish current to said speed control apparatus and operative thereon to reduce the speed of operation of said line feeding motor in accordance with increase in the speed of said in-out feeding motor, whereby to accommodate the operation of said line feeding mechanism to the profile of the pattern being followed.

2. In a pattern controlled machine tool, the combination with relatively movable work and pattern supporting structure and cutter and tracer supporting structure, of a slide arranged to provide for line movements of one structure relative to the other, a reversible variable speed motor operatively connected to drive said line slide, a second slide arranged to provide for in-out movements of one structure relative to the other in direction transverse to the direction of said line movement, a second reversible variable speed motor operatively connected to drive said in-out slide, an electric generator operatively connected to be driven by each of said motors, a tracer mechanism operatively connected to control said in-out motor in accordance with the requirements of a pattern being traced, and control mechanism operatively connected to control said line motor in accordance with the combined output of said two electric generators.

3. In a pattern controlled machine tool, a pattern and work supporting structure, a tracer and cutter supporting structure, a base disposed to carry said structures for relative movement in mutually transverse paths, an electric motor operatively connected to effect relative line feeding movement of said structures along one of said paths, speed governing apparatus operatively connected to govern the speed of said line feeding motor, a second electric motor operatively connected to effect relative in-out feeding movements of said structures along another of said paths, a tracer control mechanism carried by said tracer and cutter supporting structure for cooperating with a patten carried by said pattern and work supporting structure and operatively connected to control said in-out feeding motor in manner to follow the profile of the pattern as it is traversed by reason of said line feeding movement, and control mechanism responsive to the speed of said in-out motor in either direction and operatively connected to said speed governing apparatus in manner to effect reduction in the speed of said line motor in accordance with increase in the speed of said in-out motor.

4. In a pattern controlled machine tool, the combination with a plurality of electric motors operatively arranged to effect machining movements in mutually transverse paths respectively, the tracer mechanism operatively connected to control one of said motors in following the profile of a pattern being copied, a generator driven by said tracer controlled motor, a second generator driven by a second of said motors, and speed control apparatus responsive to current generated by said two generators and operative to control the speed of said second motor, whereby the rate of traverse of said tracer mechanism relative to a pattern being traced may be accommodated to the nature of the profile of the pattern.

5. In a copying machine, the combination with two supports relatively movable in a first path for tool movement toward and from a workpiece and in another path for tool movement transversely of the workpiece, of transmission mechanism for effecting relative movements of said supports in said paths, control means for said transmission mechanism including a tracer device having elements relatively movable under the control of a pattern to relative positions determinative of movement toward and from the workpiece, and speed control means operative in response to movement in both said paths for controlling the speed of movement transversely of the workpiece, whereby to maintain the sum of the speeds in both paths substantially constant through operation of said tracer device in controlling movement toward and from the workpiece.

6. In a copying machine, the combination of two supports relatively movable in a first path in opposite directions respectively for effecting relative movement of a tool and a workpiece toward and from one another and in a second path for relative traversing movement of the tool and the workpiece, power operated transmission mechanism for effecting said relative movements of said supports, control means for said mechanism including tracer means having elements relatively movable under the control of a pattern and operative to effect said toward and from relative movements, and speed control means operative to maintain the traversing movement at a speed established in response to the speed of the traversing movement and the speed of the toward and from movement, whereby the sum of the speeds in the two paths may be maintained substantially constant through action of said tracer in controlling the toward and from movement as it traverses the pattern at the speed of the traversing movement.

7. In a pattern controlled machine tool including mechanism for effecting line movement and other mechanism for effecting in-out movement, a tracer apparatus operatively connected to control said in-out movement mechanism in accordance with the requirements of a pattern being followed, and control apparatus operatively connected to control said line movement mechanism in accordance with the combined speeds of operation of said in-out movement mechanism and said line movement mechanism.

8. In a tracer controlled machine tool, a motor operatively connected to effect line movement, a second motor operatively connected to effect in-out movement, a tracer mechanism arranged to traverse a pattern and operative to control the speed and direction of operation of said in-out motor in accordance with the requirements of the pattern, and control mechanism responsive to the sum of the speeds of said two motors and operative to control the speed of said line motor accordingly.

9. In a copying machine, the combination with two supports relatively movable in mutually transverse paths, of transmission mechanism for effecting movement of said supports including two motors respectively connected to effect relative movements in said two paths, tracer control means movable under the control of a pattern and operative to control one of said motors, and speed responsive control means movable in response to the sum of the speeds of said two motors and operative to control the speed of the other of said motors.

10. In a tracer controlled machine tool, the combination with a slide arranged for effecting line movements and a second slide arranged for effecting in-out movements transversely of the direction of said line movements, of a reversible variable speed motor operatively connected to drive each of said slides in either direction selectively, a tracer mechanism operatively connected to control said in-out slide driving motor in accordance with the requirements of a pattern being traced, a generator responsive to the speed of said in-out motor, a second generator responsive to the speed of said line motor, and control apparatus responsive to operation of said two generators and operative to regulate the speed of said line motor.

11. In a machine tool, a plurality of relatively movable machine elements, a first motor operatively connected to effect relative movement of said elements along a predetermined path, a second motor operatively connected to effect relative movement of said elements along another path, control mechanism arranged to control said first motor as to speed and direction of operation in predetermined manner, and control apparatus responsive to the speeds of both said motors and operative upon said second motor in manner to maintain the sum of the speeds of said two motors substantially constant.

12. In a pattern controlled machine tool, the combination with line feeding and in-out feeding mechanism, of an electric motor operatively connected to actuate said line feeding mechanism, a generator driven by said line feeding electric motor, a voltage-squaring device responsive to the voltage developed by said generator, speed control apparatus responsive to current from said voltage-squaring device and operative to control the speed of said line feeding motor thereby to limit the maximum speed of operation of said motor, a second electric motor operatively connected to actuate said in-out feeding mechanism, a tracer mechanism operative to control said in-out feeding electric motor in accordance with the requirements of a pattern being followed, a second generator driven by said in-out feeding motor, and a second voltage-squaring device responsive to the voltage developed by said second generator, said second voltage-squaring device likewise being connected to furnish current to said speed control apparatus and operative thereon to reduce the speed of operation of said line feeding motor in accordance with increase in the speed of said in-out feeding motor, whereby to accommodate the operation of said line feeding mechanism to the profile of the pattern being followed.

13. In a pattern controlled machine tool, the combination with a work and pattern supporting structure and a cutter and tracer supporting structure, of a slide arranged to provide for line movements of one of said structures relative to the other, a reversible variable speed motor operatively connected to drive said line slide, a second slide arranged to provide for in-out movements of one of said structures relative to the other in direction transverse to the direction of said line movement, a second reversible variable speed motor operatively connected to drive said in-out slide, an electric generator operatively connected to be driven by said line driving motor, a second such generator operatively connected to be driven by said in-out driving motor, a tracer mechanism operatively connected to control said in-out motor in accordance with the requirements of a pattern being traced, and control mechanism operatively connected to control said line motor in accordance with the combined output of said two electric generators, whereby the sum of the speeds of movement of said slides may be maintained substantially constant.

14. In a pattern controlled machine tool, the combination with a plurality of electric motors operatively arranged to effect machining movements in mutually transverse paths respectively, of tracer mechanism operatively connected to control one of said motors in following the profile of a pattern being copied, a generator driven by said tracer controlled motor, a voltage-squaring device operatively connected to be actuated by said generator, a second generator driven by a second of said motors, a second voltage-squaring device operatively connected to be actuated by said second generator, and speed control apparatus responsive to said two generators through current derived from said two voltage-squaring devices and operative to control the speed of said second motor, whereby the rate of traverse of said tracer mechanism relative to a pattern being traced may be accommodated to the nature of the profile of the pattern in manner to maintain the rate of the combined machining movement substantially constant.

15. In a tracer controlled machine tool, a work and pattern supporting table, a cutter and tracer supporting head arranged in cooperating relationship with said table, a tracer mechanism carried by said head, transmission mechanism for effecting relative movements of said table and said head along angularly disposed paths in performing a pattern copying operation, power actuated means operative upon said transmission mechanism in manner to effect relative movement along one of said paths under the control of said tracer mechanism, power actuated means operative upon said transmission mechanism in manner to effect relative movement along another of said paths, and coordinating control apparatus operating in response to the combined speeds of said two power actuated means and operative to govern the speed of said second power actuated means in accordance with said combined speeds, whereby the combined speed may be maintained substantially constant through controlling the speed of said second power actuated means and thereby limiting the speed required of said first power actuated means in performing the pattern copying operation under the control of said tracer mechanism.

EDNA MARY PARSONS,
*Executrix of the Last Will and Testament of Fred A. Parsons, Deceased.*

REFERENCES CITED

The following references are of record in the file of this patent:

UNITED STATES PATENTS

| Number | Name | Date |
|---|---|---|
| 2,228,902 | Allen | Jan. 14, 1941 |
| 2,410,295 | Kuehni et al. | Oct. 29, 1946 |
| 2,434,854 | Junkins et al. | Jan. 20, 1948 |